(12) United States Patent
Chauhan et al.

(10) Patent No.: US 12,277,092 B2
(45) Date of Patent: Apr. 15, 2025

(54) ISOLATING AND REINSTATING NODES IN A DISTRIBUTED LEDGER USING PROOF OF INNOCENCE

(71) Applicant: Bank of America Corporation, Charlotte, NC (US)

(72) Inventors: Sandeep Kumar Chauhan, Hyderabad (IN); Govinda Rajulu Nelluri, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 385 days.

(21) Appl. No.: 17/401,726

(22) Filed: Aug. 13, 2021

(65) Prior Publication Data

US 2023/0050048 A1 Feb. 16, 2023

(51) Int. Cl.
*G06F 16/182* (2019.01)
*G06F 11/30* (2006.01)

(52) U.S. Cl.
CPC .......... *G06F 16/1837* (2019.01); *G06F 11/30* (2013.01)

(58) Field of Classification Search
None
See application file for complete search history.

(56) References Cited

U.S. PATENT DOCUMENTS

| 10,681,059 | B2 | 6/2020 | Shaikh et al. |
| 10,902,117 | B1 | 1/2021 | Singh et al. |
| 11,216,816 | B1 * | 1/2022 | Dietrich ............. G06Q 20/4016 |
| 2021/0135867 | A1 * | 5/2021 | Zeng ......................... H04L 9/50 |

FOREIGN PATENT DOCUMENTS

| CN | 111190888 A | * | 5/2020 | |
| CN | 113258986 A | * | 8/2021 | ......... H04B 7/18521 |
| JP | 2020528607 A | | 9/2020 | |
| WO | WO-2020061822 A1 | * | 4/2020 | |

* cited by examiner

*Primary Examiner* — Schquita D Goodwin
*Assistant Examiner* — Ishrat Rashid
(74) *Attorney, Agent, or Firm* — Banner & Witcoff, Ltd.

(57) ABSTRACT

Aspects of the disclosure relate to isolating and reinstating nodes in a distributed ledger using proof of innocence. In some embodiments, a first plug-in embedded with the blockchain network may monitor consumer-initiated transactions submitted to an enterprise organization node to determine the legitimacy of each consumer-initiated transaction. The first plug-in may identify consumer-initiated transactions associated with malicious activity and may flag the consumer node for further analysis. A second plug-in may identify and analyze the consumer-initiated transactions associated with the consumer node to determine a proof of innocence value associated with the consumer node. The first plug-in may isolate the consumer node from the distributed ledger if the proof of innocence value exceeds a proof of innocence threshold. Alternatively, the first plug-in may permit the consumer node to remain within the distributed ledger if the proof of innocence value falls below the proof of innocence threshold.

20 Claims, 11 Drawing Sheets

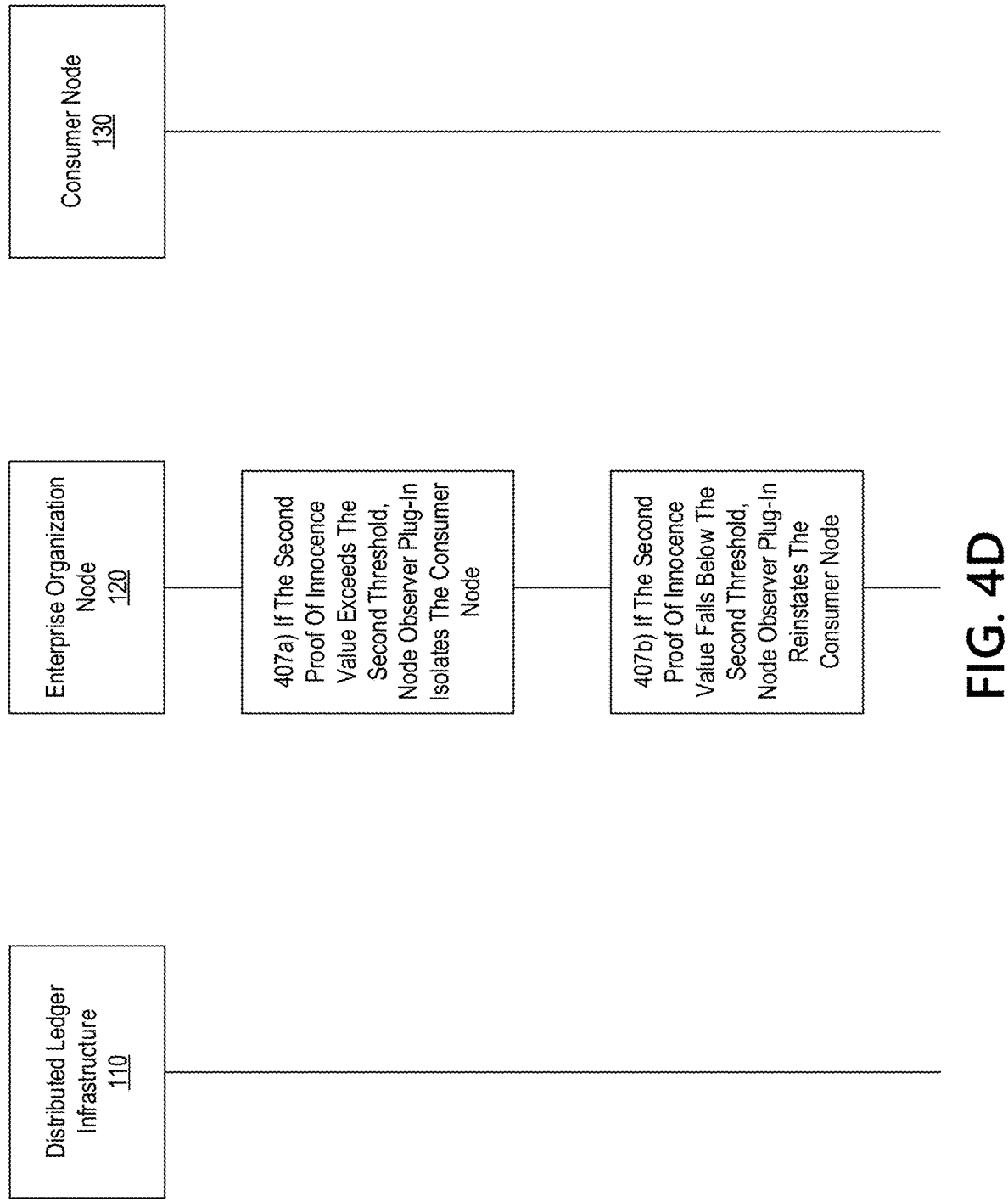

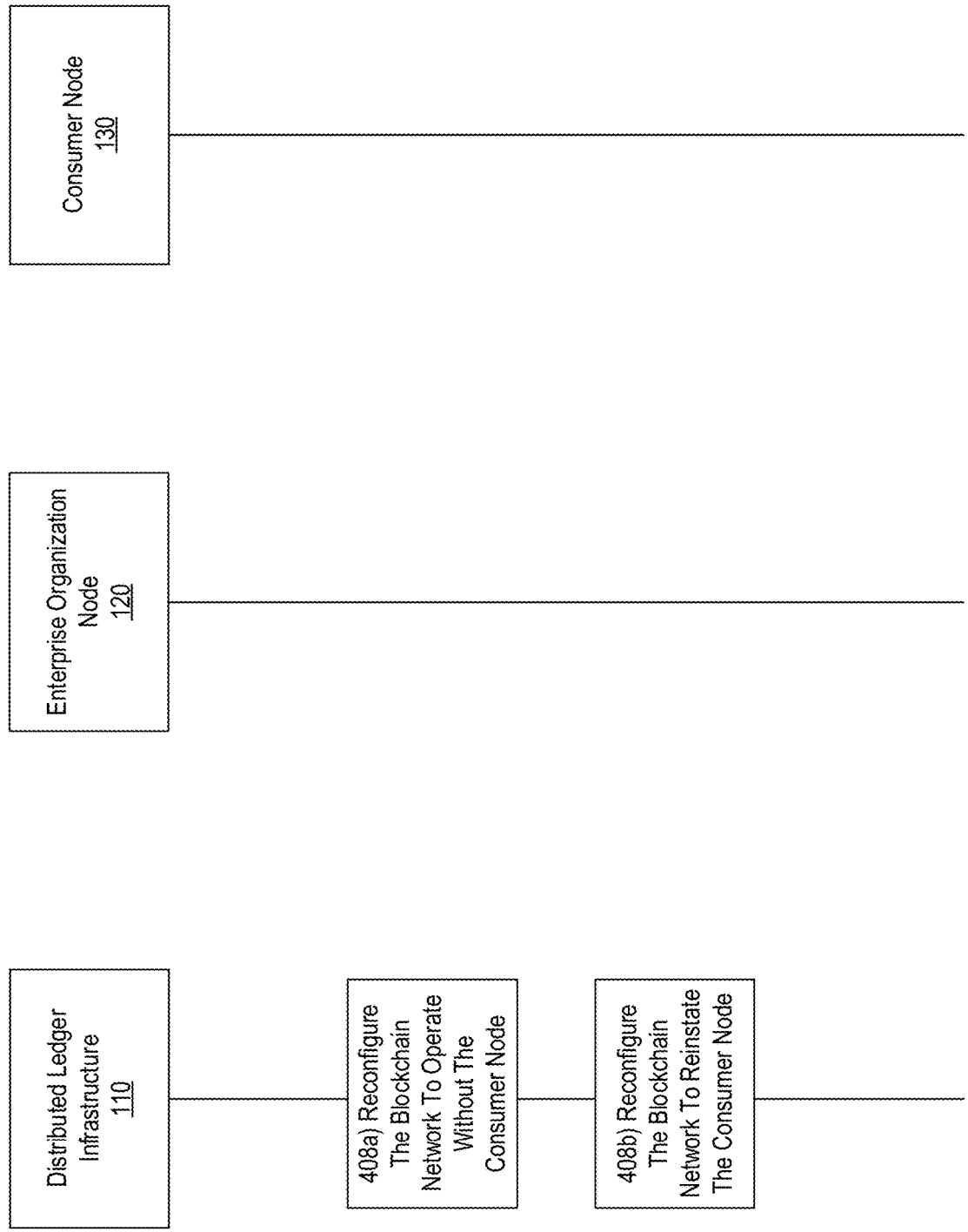

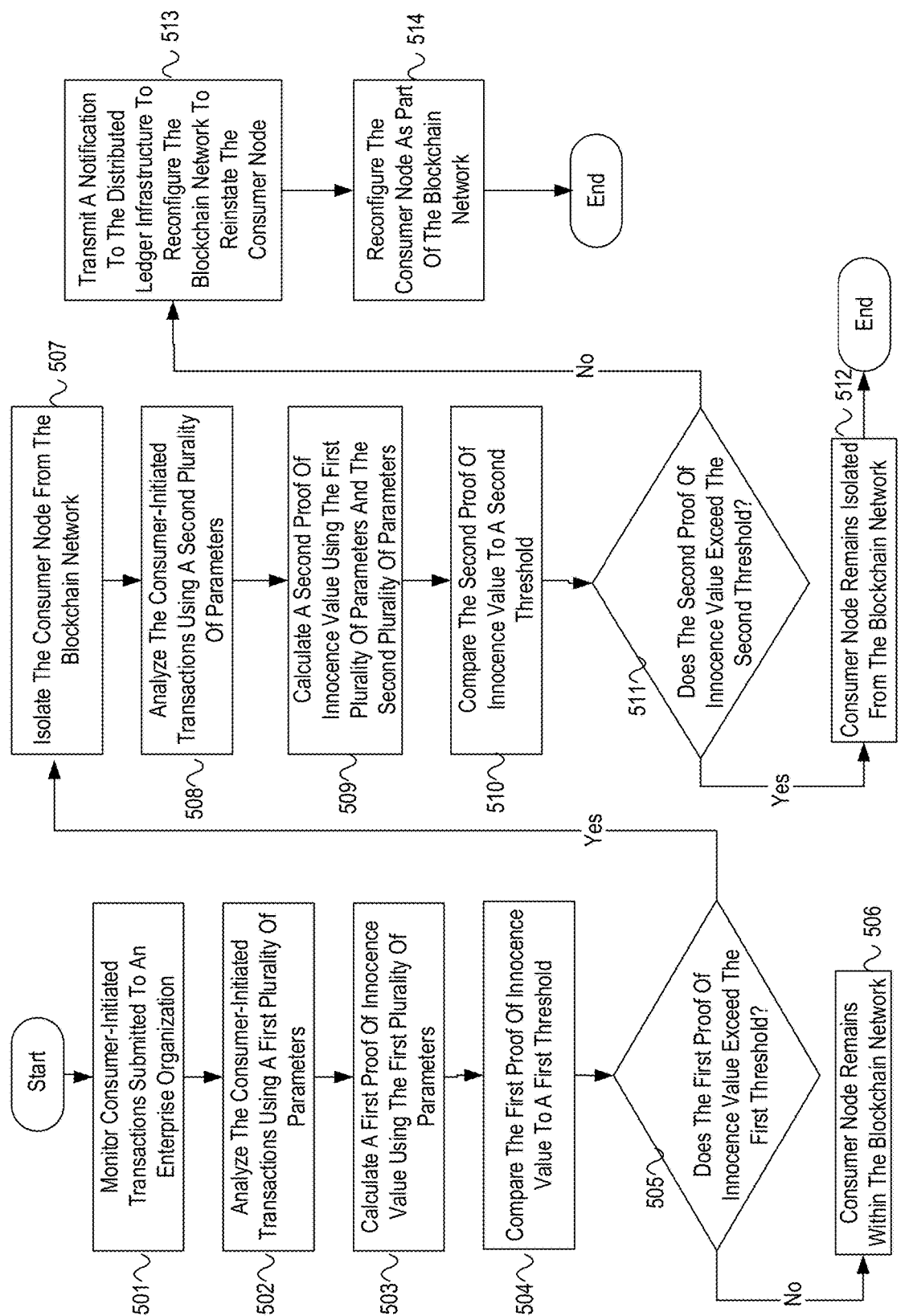

ISOLATING AND REINSTATING NODES IN A DISTRIBUTED LEDGER USING PROOF OF INNOCENCE

BACKGROUND

Aspects of the disclosure relate to hardware and software for isolating and reinstating nodes in a distributed ledger using proof of innocence. In particular, one or more aspects of the disclosure relate to determining a proof of innocence value and comparing the proof of innocence value to a proof of innocence threshold to determine the legitimacy of a consumer-initiated transaction.

Enterprise organizations routinely employ distributed ledgers as a secure and trusted method of gathering and storing transaction data. One characteristic of a distributed ledger is its immutability. While immutability of the nodes increases security and transparency, immutability of the nodes makes it difficult to isolate nodes that have been flagged for engaging in suspicious activity. For example, a node may be flagged for routinely initiating large financial transactions despite a ledger indication of insufficient funds. A pattern of such transactions may jeopardize the security of the Smart Contract generated between the node in question and a number of additional entities. The behavior of the node in question may burden the operation and functionality of the blockchain network as a whole. However, current blockchain technology does not accommodate instances where a node should be removed from a blockchain network based on an indication of suspicious activity associated with the node

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with isolating and reinstating nodes in a distributed ledger using proof of innocence.

In accordance with one or more embodiments, a system may be configured to operate in a decentralized peer-to-peer (P2P) network, wherein the system may comprise network topology storage. The network topology storage may be configured to store consumer-initiated transactions submitted to an enterprise organization node, parameters used to analyze the consumer-initiated transactions, a proof of innocence value associated with a consumer node, and a determination value indicating whether the consumer node is to be isolated or reinstated. The network topology storage may be distributed throughout (e.g., across) the P2P network. The system may comprise a node observer plug-in configured to analyze the consumer-initiated transactions, determine a proof of innocence calculator, compare the proof of innocence value to a first threshold, determine to, based on the proof of innocence value exceeding the first threshold, isolate the consumer from the P2P network or, based on the proof of innocence value falling below the first threshold, allow the consumer to remain within the P2P network, and validate, based on a second proof of innocence value exceeding a second threshold, that the consumer node is isolated from the P2P network. The system may comprise a proof of innocence calculator configured to determine a proof of innocence value associated with the consumer node.

In accordance with one or more embodiments, a node observer plug-in may be configured to operate in a decentralized peer-to-peer (P2P) network. The node observer plug-in may comprise one or more processors. The node observer plug-in may comprise memory storing at least a portion of a blockchain of the decentralized P2P network and computer-readable instructions that, when executed by the one or more processors, may cause the node observer plug-in to analyze consumer-initiated transactions associated with a consumer node. The instructions, when executed by the one or more processors, may cause the node observer plug-in to determine a proof of innocence calculator, wherein the proof of innocence calculator may be configured to determine a first proof of innocence value associated with the consumer node. The instructions, when executed by the one or more processors, may cause the node observer plug-in to compare the first proof of innocence value to a first threshold. The instructions, when executed by the one or more processors, may cause the node observer plug-in to determine to, based on the first proof of innocence value exceeding the first threshold, isolate the consumer node from the P2P network or, based on the first proof of innocence value falling below the first threshold, allow the consumer node to remain within the P2P network. The instructions, when executed by the one or more processors, may cause the node observer plug-in to validate, based on a second proof of innocence value exceeding a second threshold, that the consumer node is isolated from the P2P network.

In accordance with one or more embodiments, a method may comprise, at a computing device configured to operate in a peer-to-peer (P2P) network and including at least one or more processors and memory storing at least a portion of a blockchain of the P2P network, analyzing, by a node observer plug-in, consumer-initiated transactions associated with a consumer node, wherein the consumer-initiated transactions may be submitted to an enterprise organization node. The method may comprise determining, by a proof of innocence calculator, a first proof of innocence value associated with the consumer node. The method may comprise comparing, by the node observer plug-in, the first proof of innocence value to a first threshold. The method may comprise determining, by the node observer plug-in, to, based on the first proof of innocence value exceeding the first threshold, isolate the consumer node from the P2P network or, based on the first proof of innocence value falling below the first threshold, allow the consumer node to remain within the P2P network. The method may comprise validating, by the node observer plug-in and based on a second proof of innocence value exceeding a second threshold, that the consumer node is isolated from the P2P network.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 4A-4E depict an illustrative event sequence for isolating and reinstating nodes in a distributed ledger using proof of innocence in accordance with one or more example embodiments; and FIG. 5 depicts an illustrative method isolating and reinstating nodes in a distributed ledger using proof of innocence in accordance with one or more example embodiments.

DETAILED DESCRIPTION

Figure 1:
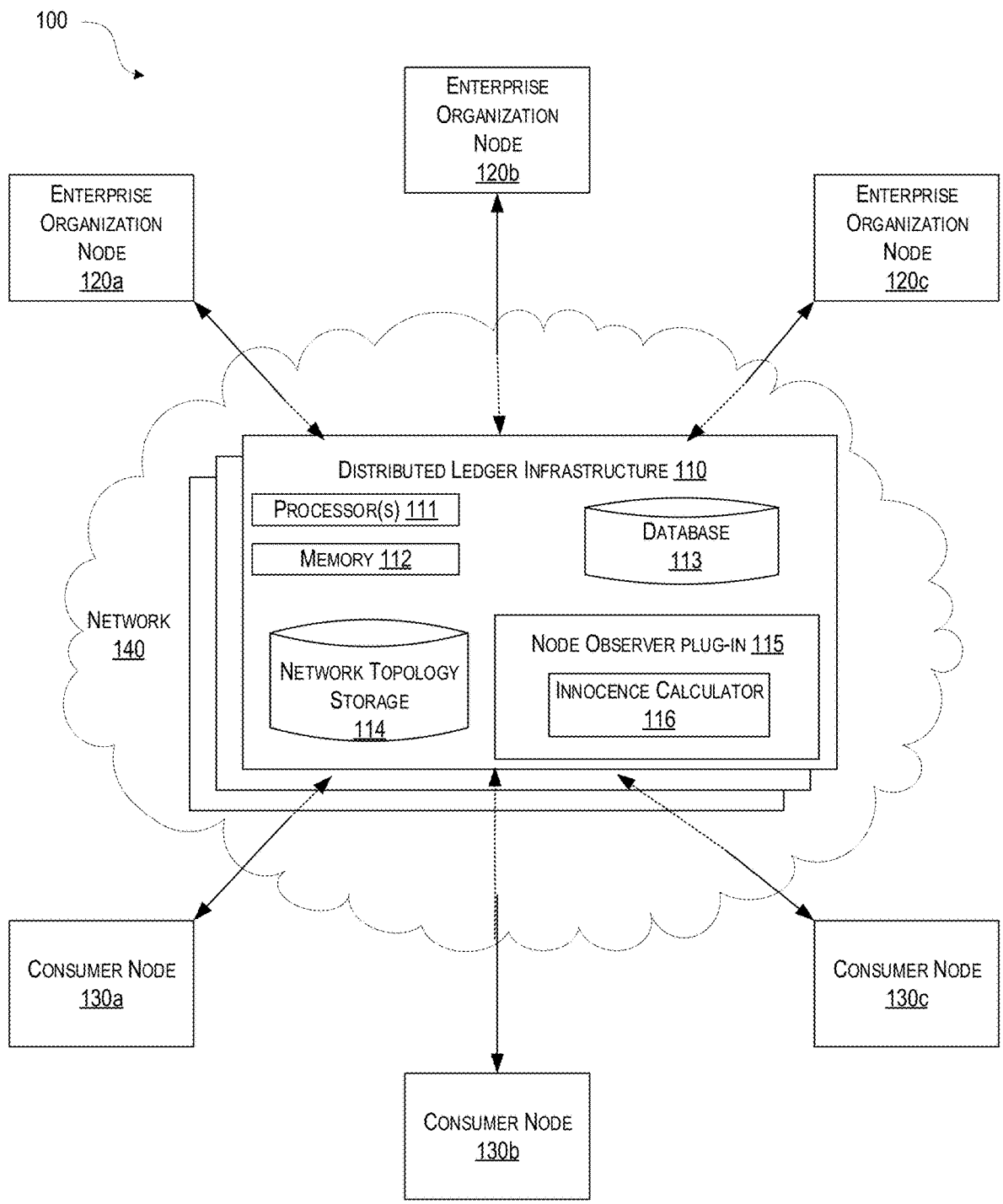
FIG. 1 depicts an illustrative example of a centralized computer system for isolating and reinstating nodes in a distributed ledger using proof of innocence in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current blockchain technology does not accommodate instances where a node within a blockchain network may be removed from the network based on suspicious activity associated with the node. Accordingly, proposed herein is a solution to the problem described above that includes isolating nodes in a distributed ledger, based on suspicious activity associated with the node, using a proof of innocence value associated with the node. The solution proposed herein further includes reinstating nodes into a distributed ledger, using a proof of innocence value, based on determining that the proof of innocence value associated with the node satisfies a threshold. For example, the blockchain network may contain a plurality of enterprise organization nodes, a plurality of consumer nodes, network topology storage, a node observer plug-in, and an innocence calculator. The network topology storage may be distributed throughout the blockchain network, such that the data associated with each node may be stored within the network topology storage. The node observer plug-in and the innocence calculator may be embedded within the infrastructure of the blockchain network. As such, each node within the blockchain network may access and may utilize the node observer plug-in and the innocence calculator. The node observer plug-in embedded within each consumer node may monitor each consumer-initiated transaction submitted to an enterprise organization node. The node observer plug-in may analyze each consumer-initiated transaction using a plurality of parameters. The innocence calculator embedded within the consumer node may assign a weight to each parameter of the plurality of parameters. The innocence calculator may use the weighted parameters to calculate a proof of innocence value. The node observer plug-in may compare the proof of innocence value to a threshold. If the node observer plug-in determines that the proof of innocence value falls below the threshold, the node observer plug-in may allow the consumer node to remain a part of the blockchain network. Alternatively, if the node observer plug-in determines that the proof of innocence value exceeds the threshold, the node observer may isolate the consumer node from the rest of the blockchain network. The node observer plug-in may further analyze the consumer-initiated transactions associated with the consumer node to validate that the consumer node is isolated from the blockchain network. The node observer plug-in may compare a second proof of innocence value, associated with the consumer node, to a second threshold. If the node observer plug-in determines that the second proof of innocence value falls below the second threshold, the node observer plug-in may reinstate the consumer node as a node within the blockchain network. Alternatively, if the node observer plug-in determines that the second proof of innocence value exceeds the second threshold, the node observer may isolate the consumer node from the blockchain network.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A consumer may access the decentralized P2P system through a specialized "wallet" (i.e., Identity Wallet) that may uniquely identify the consumer and enable the consumer to perform functions related to the decentralized P2P network. Through the wallet, the consumer may be able to hold currency, submit transaction requests to an enterprise organization, or any other function associated with the decentralized P2P system. Furthermore, the consumer may use the wallet to request performance of network-specific functions related to the decentralized P2P system such as fund and/or asset transfers. The various computing devices forming the decentralized P2P computing system may operate as a team to perform network-specific functions requested by the consumer. In performing the network-specific functions, the various computing devices may produce blocks that store the data generated during the performance of the network-specific functions and may add the blocks to the blockchain.

After the block has been added to the blockchain, the wallet associated with the consumer may indicate that the requested network-specific function has been performed.

For example, a consumer's wallet may contain identification documentation associated with the consumer. The consumer may use the identification documentation in the wallet to initiate a transaction with an enterprise organization (e.g., a transfer of funds). The consumer may submit, to the decentralized P2P system, a request to transfer a substantial amount of funds from a first account, associated with the consumer, to a second account, associated with a first entity. The various computing devices forming the decentralized P2P computing system may review the account balance of the first account to determine whether the first account contains sufficient funds to conduct the transfer and, upon confirming that there are sufficient funds, may perform the transfer. In doing so, a block may be created by the various computing devices of the decentralized P2P computing system. The block may store data indicating that the consumer-initiated transaction (e.g., the fund transfer) was completed. The various computing devices may add the block to the blockchain. The wallet associated with the consumer may reflect the balance of the first account, associated with the consumer, in light of the fund transfer.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as consumer-initiated transactions, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, financial loan requests, cryptocurrency, digital content storage and delivery, entity authentication and authorization, digital identity, marketplace creation and operation, internet of things (IoT), prediction platforms, currency exchange and remittance, P2P transfers, ride sharing, and precious metal and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system which may request the performance of network functions (e.g., consumer-initiated transaction requests) within a decentralized network, but might not be capable of executing the requested network functions or maintaining inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be requested by full nodes in the decentralized system.

"Network functions" and/or "network-specific functions," as described herein, may relate to functions which are able to be performed by nodes of a decentralized P2P network. In some arrangements, the data generated in performing network-specific functions may be stored on a blockchain associated with the decentralized P2P network. An example of a network function may include consumer-initiated transaction requests. A consumer-initiated transaction request may describe a request, submitted by a consumer, to initiate a transaction with an enterprise organization and may be associated with one or more nodes within a decentralized network.

Computer Architecture

FIG. 1 depicts an illustrative example of centralized computer system 100 that may be used for isolating and reinstating nodes in a distributed ledger using proof of innocence. Centralized computer system 100 may comprise one or more computing devices including at least distributed ledger infrastructure 110, enterprise organization node 120a-120c, and consumer nodes 130a-130c. While FIG. 1 depicts more than one enterprise organization node (e.g., enterprise organization nodes 120a-120c), each of enterprise organization nodes 120a-120c may be configured in accordance with the features described herein. While the description herein may make reference to enterprise organization node 120, it is important to note that the functions described in connection with enterprise organization node 120 may be performed by any one of enterprise organization nodes 120a-120c. Additionally, while FIG. 1 depicts more than one consumer node (e.g. consumer nodes 130a-130c), each of consumer node 130a-130c may be configured in accordance with the features described herein. While the description herein may make reference to consumer node 130, it is important to note that the functions described in connection with consumer node 130 may be performed by any one of consumer nodes 130a-130c. Each one of enterprise organization nodes 120a-120c and consumer nodes 130a-130c may be configured to communicate with distributed ledger infrastructure 110 through network 140. In some arrangements, centralized computer system 100 may include additional computing devices and networks that are not depicted in FIG. 1, which may also be configured to interact with distributed ledger infrastructure 110 and, in some instances, consumer nodes 130a-130c.

Distributed ledger infrastructure 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Distributed ledger infrastructure 110 may include computing hardware and software that may host various data and applications for performing tasks of the centralized entity and interacting with consumer nodes 130a-130c, as well as other computing devices. Each computing device within distributed ledger infrastructure 110 may contain processor(s) 111, memory 112, and database 113, which may be stored in memory of the one or more computing devices of distributed ledger infrastructure 110. Distributed ledger infrastructure 110 may contain network topology storage 114, node observer plug-in 115, and innocence calculator 116, each of which is discussed in greater detail in connection with FIG. 2B. Through execution of computer-readable instructions stored in memory, the computing devices of distributed ledger infrastructure 110 may be configured to perform functions of the centralized entity and store the data generated during the performance of such functions in database 113.

In some arrangements, distributed ledger infrastructure 110 may include and/or be part of enterprise information technology infrastructure and may host a plurality of enterprise applications, enterprise databases, and/or other enterprise resources. Such applications may be executed on one or more computing devices included in distributed ledger infrastructure 110 using distributed computing technology and/or the like. In some instances, distributed ledger infrastructure 110 may include a relatively large number of servers that may support operations of the enterprise organization, such as a financial institution. Distributed ledger infrastructure 110, in this embodiment, may generate a single centralized ledger for data received from the various consumer nodes 130, which may be stored in database 114.

Each of the consumer nodes 130a-130c may be configured to interact with distributed ledger infrastructure 110 through network 140. In some instances, one or more of the consumer nodes 130a-130c may be configured to receive and transmit information corresponding to system requests through particular channels and/or representations of webpages and/or applications associated with distributed ledger infrastructure 110. The system requests provided by consumer nodes 130a-130c may initiate the performance of particular computational functions such as data and/or file transfers at distributed ledger infrastructure 110. In such instances, the one or more of the consumer nodes 130a-130c may be internal computing devices associated with the particular entity corresponding to distributed ledger infrastructure 110 and/or may be external computing devices which are not associated with the particular entity.

As stated above, centralized computer system 100 also may include one or more networks, which may interconnect one or more of distributed ledger infrastructure 110 and one or more consumer nodes 130a-130c and enterprise organization nodes 120a-120c. For example, centralized computer system 100 may include network 140. Network 140 may include one or more sub-networks (e.g., local area networks (LANs), wide area networks (WANs), or the like). Furthermore, centralized computer system 100 may include a local network configured to interconnect each of the computing devices comprising distributed ledger infrastructure 110.

Figure 2A:
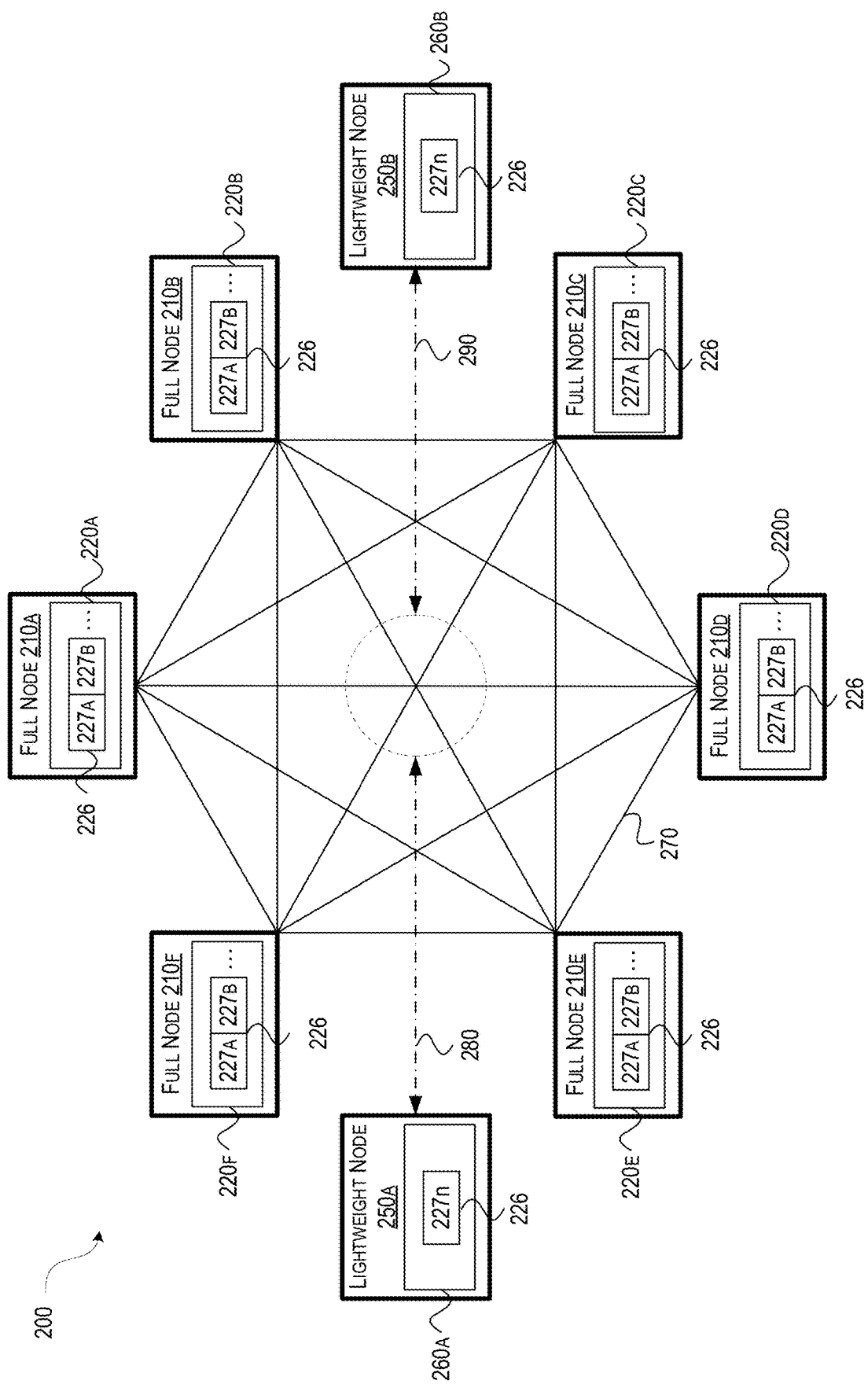
FIGS. 2A-2B (collectively referred to as FIG. 2) depict an illustrative example of a decentralized P2P computer system that may be used for isolating and reinstating nodes in a distributed ledger using proof of innocence in accordance with one or more example embodiments.

FIG. 2A depicts an illustrative example of decentralized P2P computer system 200 that may be used for isolating and reinstating nodes in a distributed ledger using proof of innocence. Decentralized P2P computer system 200 may include a plurality of full node computing devices 210A, 210B, 210C, 210D, 210E, and 210F and lightweight node computing devices 250A and 250B, which may be respectively similar to full node computing device 210 described in FIG. 3A and lightweight node computing device 250 described in FIG. 3B. While a particular number of full node computing devices and lightweight node computing devices are depicted in FIG. 2A, it should be understood that a number of full node computing devices and/or lightweight node computing devices greater than or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270. Enterprise organization node 120 may be one of full node computing devices 210A-210F as enterprise organization node 120 may cause functions to be executed within decentralized P2P computer system 200.

Lightweight node computing devices 250A and 250B may request execution of network functions related to blockchain 226 in decentralized P2P network 270. In order to request execution of network functions, such as a consumer-initiated transaction, processors of lightweight node computing devices 250A and 250B may execute network commands to broadcast the network functions to decentralized P2P network 270 comprising full node computing devices 210A-210F. Consumer node 130 may be one of lightweight node computing devices 250A or 250B as consumer node 130 may submit function requests to decentralized P2P network 270.

In some arrangements, a plurality of network function requests may be broadcasted across decentralized network P2P network 270. Processors, ASIC devices, and/or GPUs of full node computing devices 210A-210F may execute network protocols to receive broadcast of each of the network functions through decentralized P2P network 270 and from the requesting entities, including lightweight node computing devices 250A and 250B.

Figure 2B:
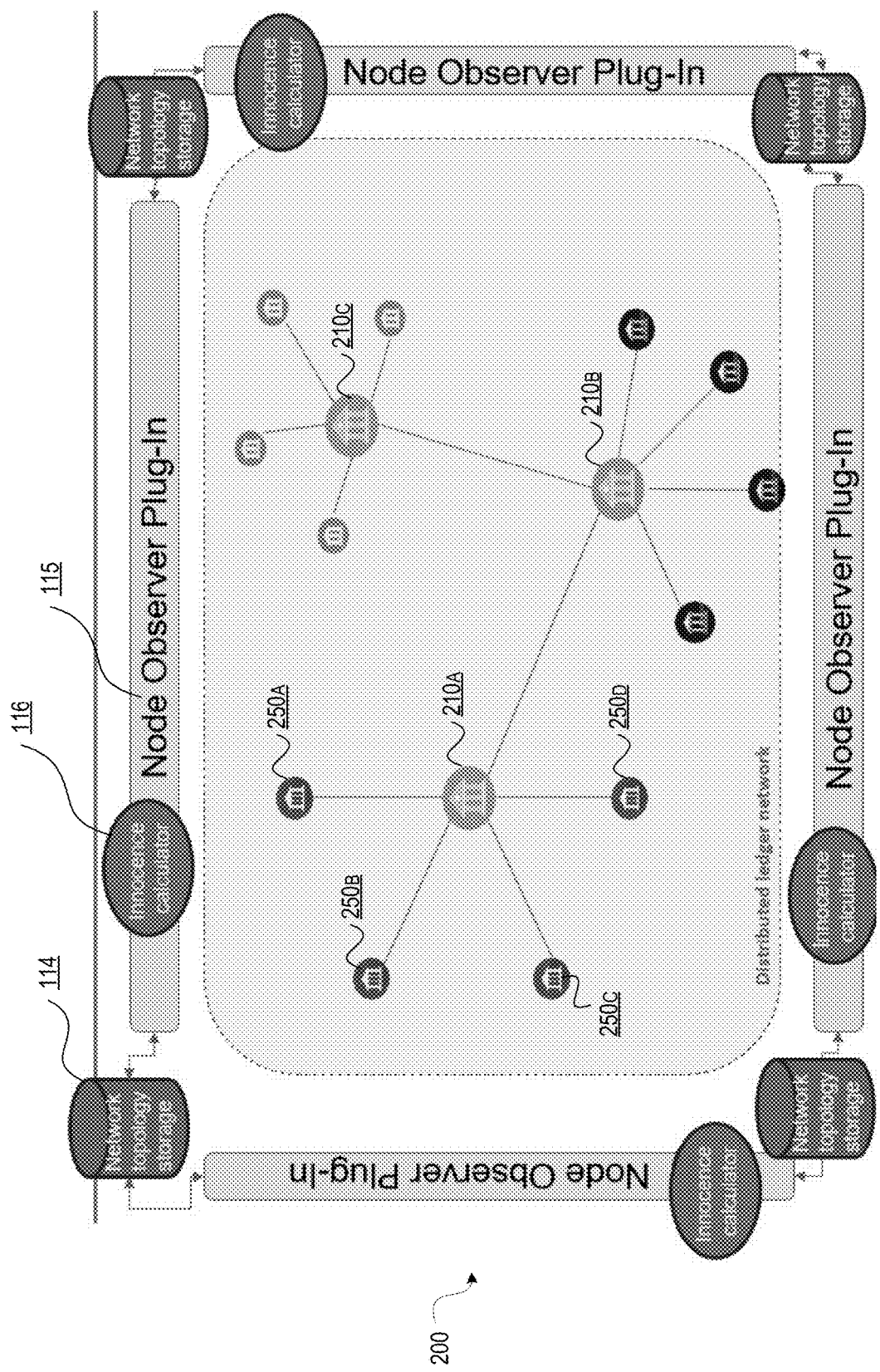

FIG. 2B further depicts illustrative example of decentralized P2P computer system 200 that may be used for isolating and reinstating nodes in a distributed ledger using proof of innocence. Decentralized P2P computer system 200 may contain distributed elements. Network topology storage 114 may be distributed throughout decentralized P2P computer system 200 such that network topology storage 114 may be accessible by enterprise organization node 120 and consumer node 130. The data with network topology storage 114 may be collected and stored by node observer plug-in 115, as discussed below. The data stored within network topology storage 114 may be used to determine a proof of innocence value for consumer node 130. The data stored within network topology storage 114 may be used to determine whether to isolate consumer node 130 from the network or to reinstate consumer node 130 as a node within the network. Network topology storage 114 may contain data associated with each consumer-initiated transaction associated with consumer node 130 and submitted to enterprise organization node 120 (e.g., when the consumer-initiated transaction was conducted, whether the consumer-initiated transaction was approved or rejected by enterprise organization node 120, the type of consumer-initiated transaction, and the like).

Network topology storage 114 may contain data associated with consumer node 130 (e.g., a total number of consumer-initiated transactions that consumer node 130 submitted to enterprise organization node 120, a number of consumer-initiated transactions that were rejected by enterprise organization node 120, an indication of whether consumer node 130 was previously flagged for engaging in suspicious transactions, proof of innocence values associated with consumer node 130 from prior analyses, a number of instances where consumer node 130 was isolated from the network, a number of instances where consumer node 130 was reinstated as a node within the network, and the like).

Network topology storage 114 may contain data associated with prior proof of innocence analyses performed on consumer node 130 (e.g., prior proof of innocence thresholds, prior proof of innocence values, prior proof of innocence determinations, and the like). Network topology storage 114 may contain data associated with enterprise organization node 120 (e.g., a number of instances where enterprise organization node may have flagged consumer node 130 for engaging in suspicious transactions, a number of instances where enterprise organization node 120 may have determined that consumer node 130 should be removed from the network, a number of instances where enterprise organization node 120 may have determined that consumer node 130 should be reinstated as a node within the network, and the like).

Access to network topology storage 114 may differ depending on the node that is requesting access to network topology storage 114 (e.g., a hierarchy of accessibility). Enterprise organization node 120 may be associated with a first level of accessibility (e.g., the least restrictive level of accessibility). Enterprise organization node 120 may perform functions on the data stored within network topology storage 114 (e.g., access the data, add additional data, remove data, and the like). Alternatively, consumer node 130 may be associated with a second level of accessibility (e.g., the most restrictive level of accessibility). Consumer node 130 may add data (e.g., data indicating a recent consumer-initiated transaction). Consumer node 130 might not be permitted to view the data within network topology storage 114 and might not be permitted to remove data from network topology storage 114.

Decentralized P2P computer system 200 may contain embedded elements. Decentralized P2P computer system 200 may contain a first plug-in (e.g., node observer plug-in 115) and a second plug-in (e.g., innocence calculator 116). Node observer plug-in 115 and innocence calculator 116 may be embedded within the network such that each node within the network (e.g., enterprise organization node 120, consumer node 130, and additional nodes not depicted here) may contain node observer plug-in 115 and innocence calculator 116. Node observer plug-in 115 may monitor activity at each node (e.g., enterprise organization node 120 and consumer node 130). Node observer plug-in 115 may collect data associated with each node and may store the collected data in network topology storage 114. Node observer plug-in 115 may use the data stored in network topology storage 114 to determine a proof of innocence value associated with consumer node 130, discussed in FIGS. 4A-4E. Node observer plug-in 115 may contain innocence calculator 116. Node observer plug-in 115 may use innocence calculator 116 to determine a proof of innocence value associated with consumer node 130. Enterprise organization node 120 may determine a weight associated with each piece of data within network topology storage 114 (e.g., each parameter). Innocence calculator 116 may use the weights determined by enterprise organization node 120 to generate a plurality of weighted parameters. Innocence calculator 116 may use the plurality of weighted parameters to determine a first proof of innocence value associated with consumer node 130. Node observer plug-in 115 may compare the first proof of innocence value to a first threshold. Enterprise organization node 120 may determine the first threshold against which the first proof of innocence value may be compared. Node observer plug-in 115 may compare the first proof of innocence value to the first threshold determined by enterprise organization node 120 to determine whether to isolate consumer node 130 from the network, as discussed in FIGS. 4A-4E.

Node observer plug-in 115 may validate the determination to isolate consumer node 130 by comparing a second proof of innocence value to a second threshold. Node observer plug-in 115 may use innocence calculator 116 to determine a second proof of innocence value, associated with consumer node 130, using parameters stored within network topology storage 114. The parameters used by innocence calculator 116 to determine the second proof of innocence value may differ from the parameters used by innocence calculator 116 to determine the first proof of innocence value associated with consumer node 130. Enterprise organization node 120 may determine a weight associated with each parameter. Innocence calculator 116 may use the weights determined by enterprise organization node 120 to generate a second plurality of weighted parameters. Innocence calculator 116 may use the first plurality of weighted parameters and the second plurality of weighted parameters to determine a second proof of innocence value associated with consumer node 130. Node observer plug-in 115 may compare the second proof of innocence value to a second threshold. Enterprise organization node 120 may determine the second threshold against which the second proof of innocence value may be compared. Node observer plug-in 115 may determine, based on comparing the second proof of innocence value to the second threshold, whether to reinstate consumer node 130 as a node within the network, as discussed in FIGS. 4A-4E.

Figure 3A:
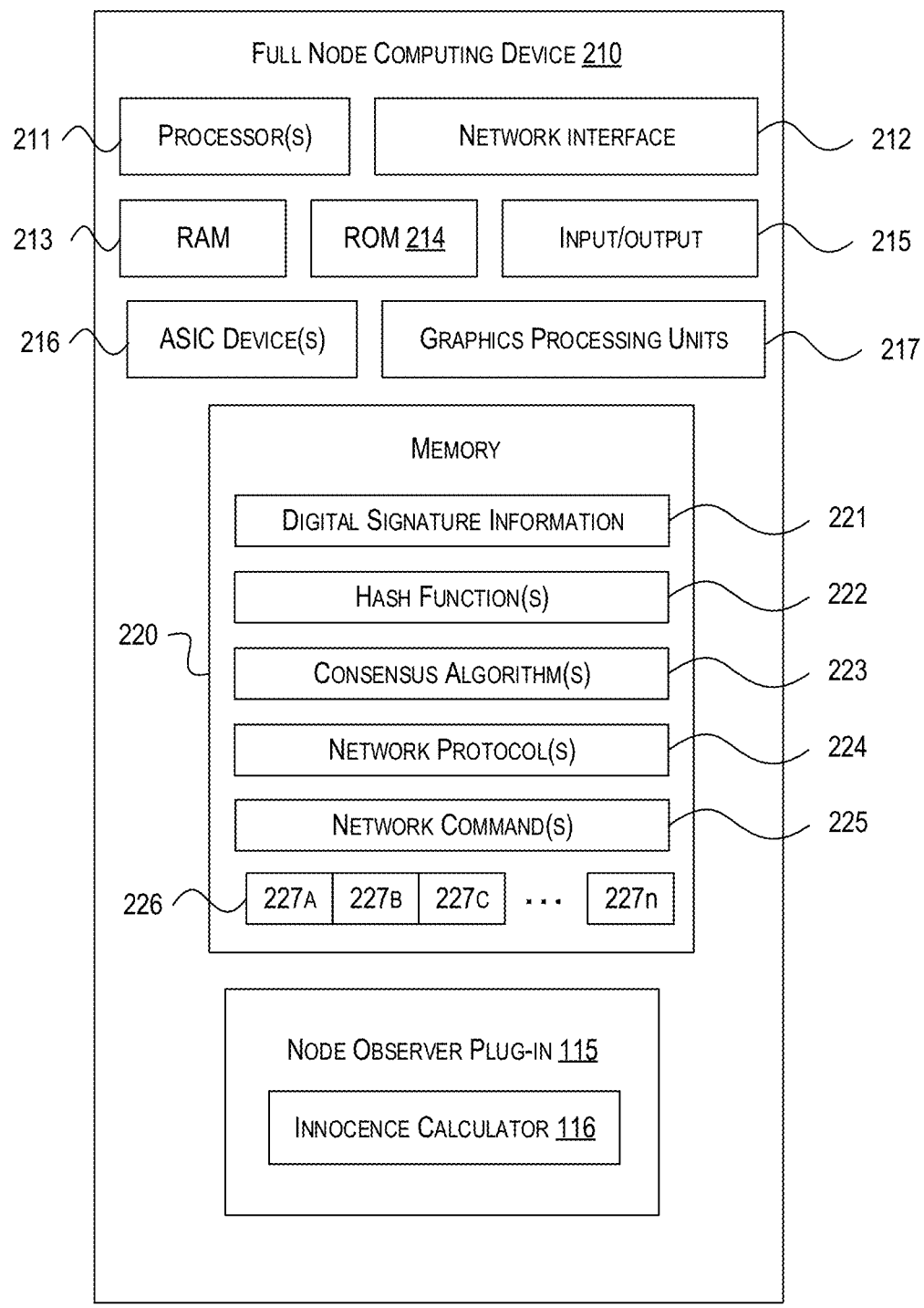
FIG. 3A depicts an illustrative example of a full node computing device that may be used for isolating and reinstating nodes in a distributed ledger using proof of innocence in accordance with one or more example embodiments.

FIG. 3A depicts an illustrative example of a full node computing device 210 that may be used for isolating and reinstating nodes in a distributed ledger using proof of innocence. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and to request execution of network functions, and/or to execute requested network functions and to maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

In order to request execution of network functions, such as a consumer-initiated transaction, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221. In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node.

Memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network. Full node computing device 210 may comprise node observer plug-in 115 and innocence calculator 116, as described in connection with FIG. 2B.

Figure 3B:
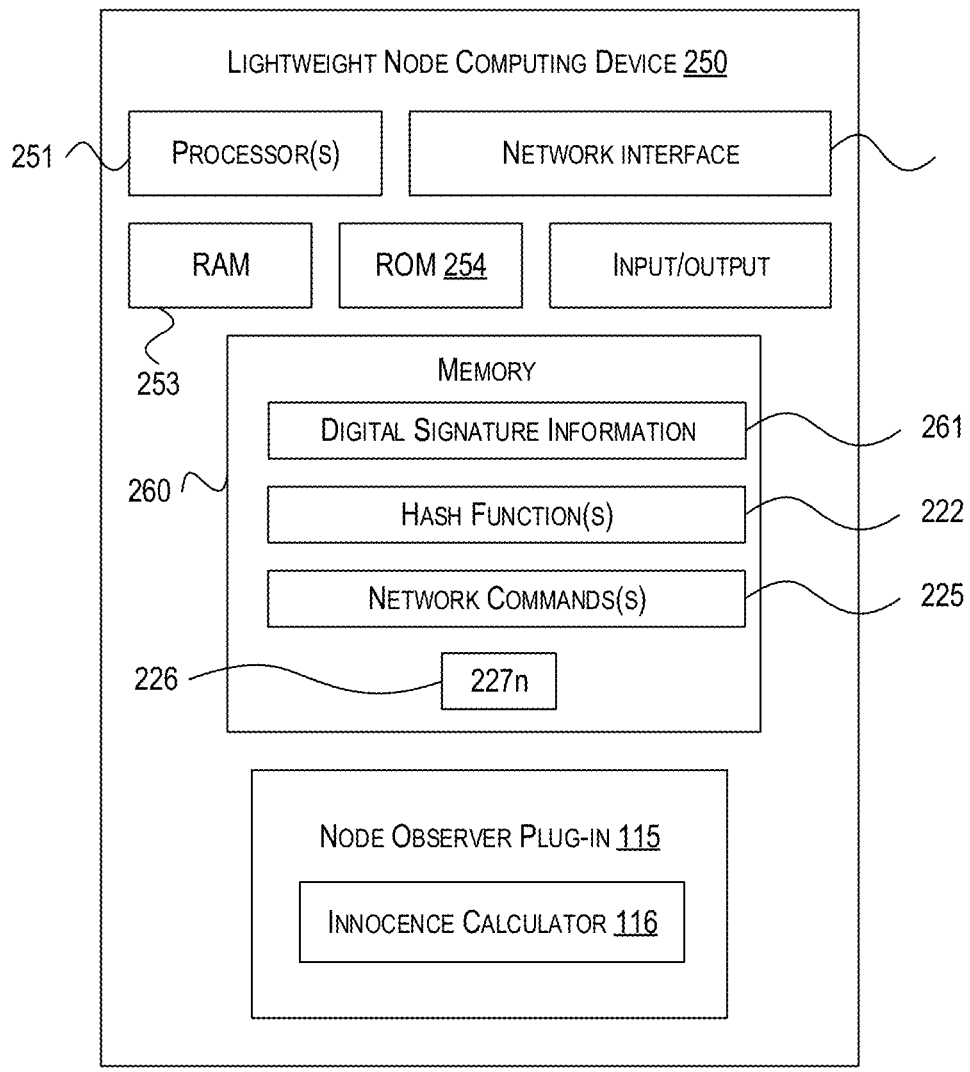
FIG. 3B depicts an illustrative example of a lightweight node computing device that may be used for isolating and reinstating nodes in a distributed ledger using proof of innocence in accordance with one or more example embodiments.

FIG. 3B depicts an illustrative example of a lightweight node computing device 250 that may be used for isolating and reinstating nodes in a distributed ledger using proof of innocence. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, or the like, and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it might not be configured to execute network functions and/or to maintain a blockchain of a decentralized P2P network. In other aspects, lightweight node computing device 250 may have substantially the same physical configuration as full node computing device 210, but may be configured with different programs and/or software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary support and/or other functionality, which may or might not be used in conjunction with aspects described herein.

In comparison to full node computing device 210, lightweight node computing device 250 might not include, in some instances, specialized hardware such as ASIC devices 216 and/or GPUs 217. This may be because lightweight node computing device 250 might not be configured to execute network functions and/or to maintain a blockchain of a decentralized P2P network as is full node computing device 210.

Memory 260 of lightweight node computing device 250 may store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210. Each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. The private/public key information of each node, whether full or lightweight, in a decentralized P2P computing network may be unique to that particular node.

Each of digital signature information 261, hash functions 222, and network commands 225 may be used and/or executed by one or more processors 251 of lightweight node computing device 250 to request execution of network functions in a decentralized P2P network. For example, in order to request execution of network functions (e.g., consumer-initiated transactions), processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Figure 4A:
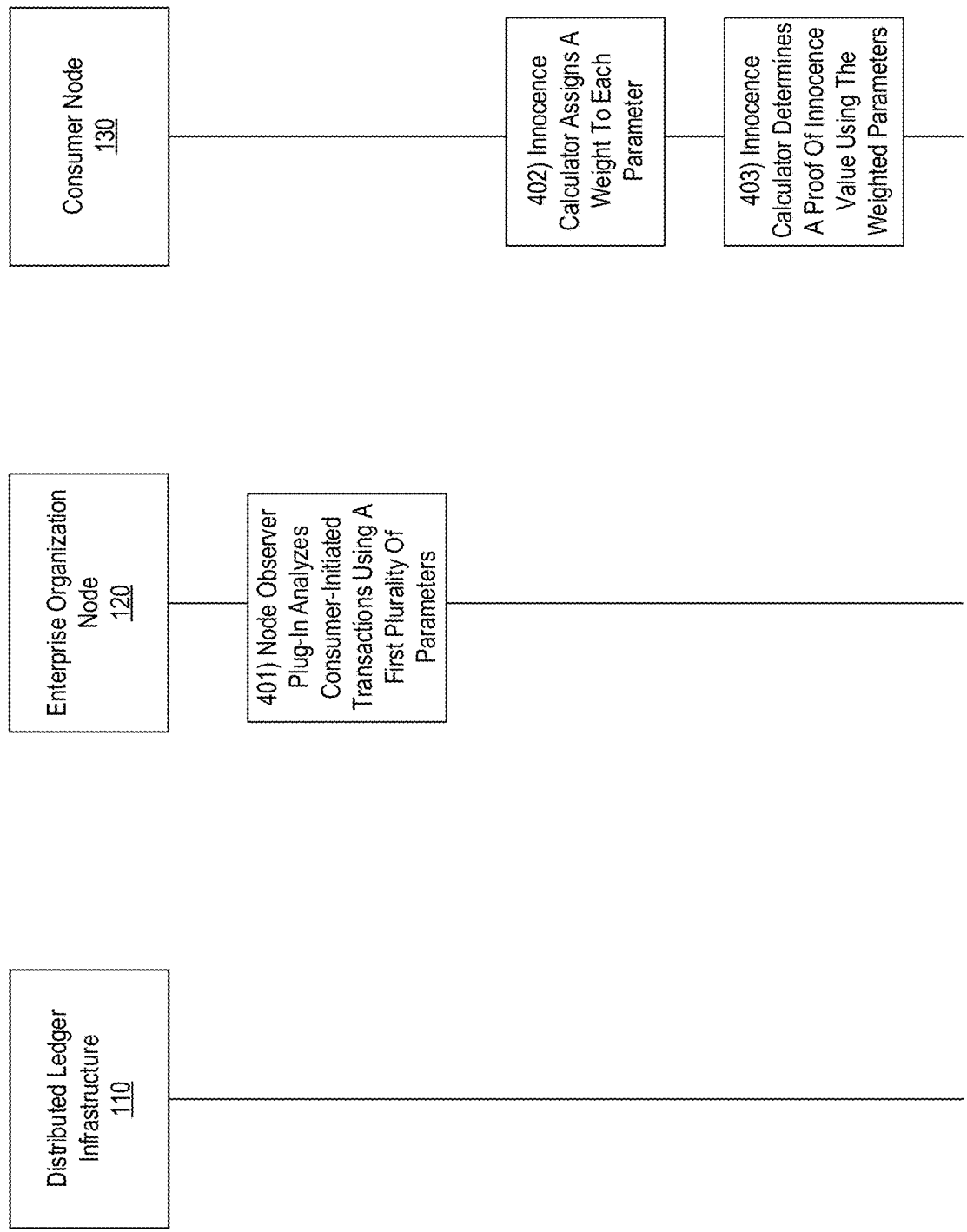

Memory 260 of lightweight node computing device 250 may store blockchain 226. Blockchain 226 stored in memory 260 of lightweight node computing device 250 may include at least block 227n, wherein block 227n represents the most immediate block of blockchain 226. As such, blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network. Lightweight node computing device 250 may comprise node observer plug-in 115 and innocence calculator 116, as described in connection with FIG. 2B Isolating and Reinstating Nodes in a Distributed Ledger Using Proof of Innocence FIGS. 4A-4E depict an illustrative event sequence for isolating and reinstating nodes in a distributed ledger using proof of innocence. Referring to FIG. 4A, at step 401, node observer plug-in 115 may analyze consumer-initiated transactions (e.g., asset transfers, a transfer of funds, and the like) associated with consumer node 130. As discussed in connection with FIG. 2B, node observer plug-in 115 may be embedded within the network such that node observer plug-in 115 may exist within each node. Node observer plug-in 115 embedded within consumer node 130 may gather data associated with consumer node 130 (e.g., a total number of consumer-initiated transactions that consumer node 130 may have submitted to enterprise organization node 120, a number of consumer-initiated transactions that may have been rejected by enterprise organization node 120, the types of consumer-initiated transactions that consumer node 130 may have submitted to enterprise organization node 120, and the like). Node observer plug-in 115 may store, within network topology storage 114, the data associated with consumer node 130. Enterprise organization node 120 may access the data stored within network topology storage 114 that is associated with consumer node 130. Node observer plug-in 115 embedded within enterprise organization node 120 may use the data (e.g., the parameters) associated with consumer node 130 to analyze consumer-initiated transactions associated with consumer node 130.

For example, node observer plug-in 115 may determine a number of consumer-initiated transactions associated with consumer node 130 (e.g., consumer node 130 may be associated with 100 consumer-initiated transactions). Node observer plug-in 115 may determine a number of consumer-initiate transactions that may have been rejected by enterprise organization node 120 (e.g., of the 100 consumer-initiated transactions associated with consumer node 130, 30 transactions may have been rejected by enterprise organization node 120). Node observer plug-in 115 may determine the types of consumer-initiated transactions that consumer node 130 may have submitted to enterprise organization node 120 (e.g., of the 100 consumer-initiated transactions associated with consumer node 130, 50 transactions were asset transfers and 50 transactions were transfers of funds). Node observer plug-in 115 may determine additional parameters, which are not discussed here, associated with consumer node 130. Based on the analyses of each parameter associated with consumer node 130, node observer plug-in 115 may determine that consumer node 130 may be engaged in suspicious consumer-initiated transactions. For example, node observer plug-in 115 may determine that consumer node 130 primarily engages in transfers of funds and that the number of consumer-initiated transactions that were rejected by enterprise organization 120 may be high (e.g., greater than or equal to 50% of the total number of consumer-initiated transactions associated with consumer node 130). Node observer plug-in 115 may flag consumer node 130 for analysis.

Node observer plug-in 115 may use a proof of innocence value associated with consumer node 130 to analyze consumer node 130. In particular, node observer plug-in 115 may use the proof of innocence value associated with consumer node 130 to determine whether to isolate consumer node 130 from the blockchain network. To determine the proof of innocence value associated with consumer node 130, node observer plug-in 115 may initialize innocence calculator 116 to determine to the proof of innocence value. Initializing innocence calculator 116 may comprise configuring innocence calculator 116 to receive, from node observer plug-in 115, the parameters determined by node observer plug-in 115. Initializing innocence calculator 116 may further comprise receiving, from enterprise organization node 120, instructions for assigning a weight to each parameter determined by node observer plug-in 115.

At step 402, innocence calculator 116 may use the instructions from enterprise organization node 120 to assign a weight to each parameter determined by node observer plug-in 115. For example, enterprise organization node 120 may instruct node observer plug-in 115 to assign a greater weight to the number of consumer-initiated transactions that may have been rejected by enterprise organization 120 than to the total number of consumer-initiated transactions associated with consumer node 130. Innocence calculator 116 may determine a weighted value for each parameter determined by node observer plug-in 115. Node observer plug-in 115 may transmit the weighted value for each parameter to network topology storage 114. Network topology storage 114 may store the weighted parameters with the data associated with consumer node 130, as discussed in connection with FIG. 2B.

At step 403, innocence calculator 116 may determine a proof of innocence value, associated with consumer node 130, using the weighted parameters determined by innocence calculator 116 in step 402. Innocence calculator 116 may combine the weighted value of each parameter determined by node observer plug-in 115. By combining the weighted value of each parameter, innocence calculator 116 may determine a proof of innocence value associated with consumer node 130. Node observer plug-in 115 may transmit the determined proof of innocence value to network topology storage 114. Network topology storage 114 may store the determined proof of innocence value with the data associated with consumer node 130, as discussed in connection with FIG. 2B.

Node observer plug-in 115 may use the determined proof of innocence value to determine whether to isolate consumer node 130 from the blockchain network. Node observer plug-in 115 may compare the proof of innocence value, determined in step 403, to a threshold. Node observer plug-in 115 may receive, from enterprise organization node 120, the threshold against which the proof of innocence value may be compared. The threshold, determined by enterprise organization node 120, may indicate the minimum proof of innocence value that may be necessary to isolate consumer node 130 from the network (e.g., a value of 40 may be the minimum proof of innocence value necessary to isolate consumer node 130 from the network). Node observer plug-in 115 may transmit the received threshold to network topology storage 114. Network topology storage 114 may store the received threshold with the data associated with consumer node 130, as discussed in connection with FIG. 2B.

Figure 4B:
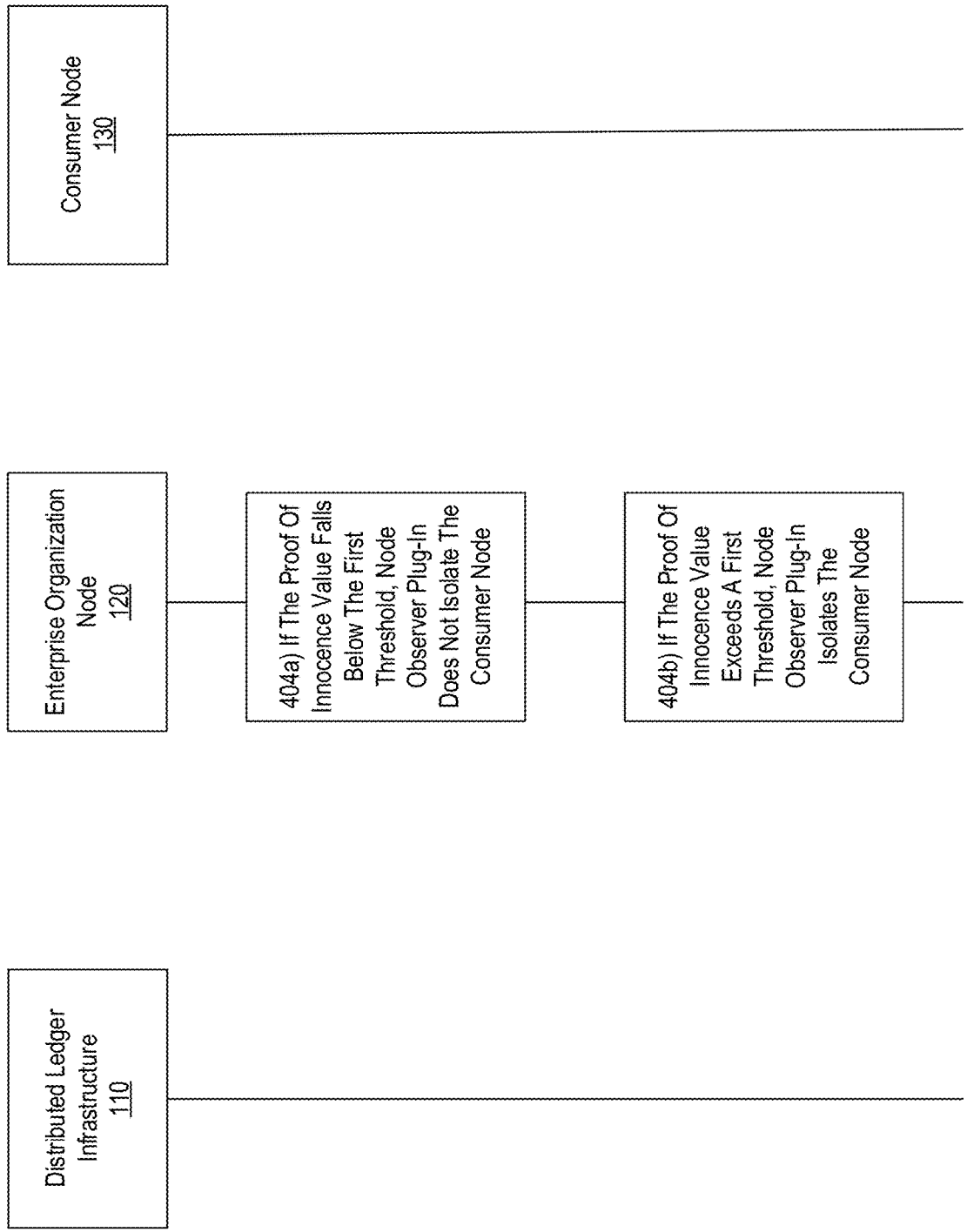

Referring to FIG. 4B, at step 404*a*, node observer plug-in 115 may determine, based on the comparison in step 403, that the proof of innocence value associated with consumer node 130 may fall below the threshold determined in step 403. Node observer plug-in 115 may determine, based on the proof of innocence value falling below the threshold, that consumer node 130 may remain with the network. For example, if the minimum value that may be necessary to isolate consumer node 130 from the network is a value of 40, a proof of innocence value of 10 may prompt node observer plug-in 115 to allow consumer node 130 to remain within the network. Node observer plug-in 115 might not perform further analyses on consumer node 130 after determining that consumer node 130 may remain within the network.

Additionally or alternatively, at step 404*b*, node observer plug-in 115 may determine, based on the comparison in step 403, that the proof of innocence value associated with consumer node 130 may exceed the threshold determined in step 403. Node observer plug-in 115 may determine, based on the proof of innocence value exceeding the threshold, that consumer node 130 may be isolated from the network. For example, if the minimum value that may be necessary to isolate consumer node 130 from the network is a value of 40, a proof of innocence value of 60 may prompt node observer plug-in 115 to isolate consumer node 130. Node observer plug-in 115 may perform further analyses on consumer node 130 after determining that consumer node 130 may be isolated from the network. In particular, node observer plug-in 115 may validate the determination to isolate consumer node 130 from the network.

Figure 4C:
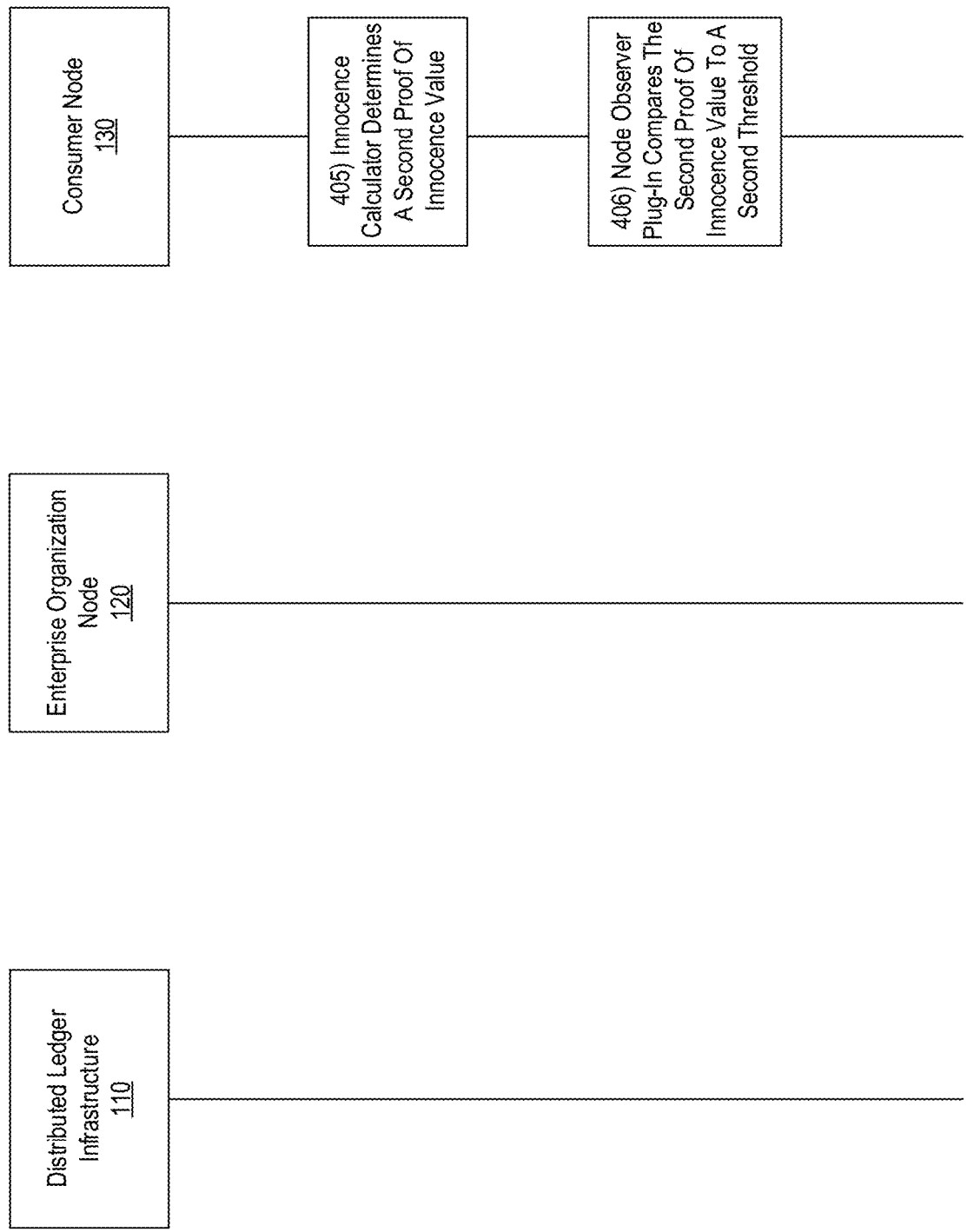

Referring to FIG. 4C, at step 405, node observer plug-in 115 may validate the determination to isolate consumer node 130 by determining a second proof of innocence value. Node observer plug-in 115 may gather, from network topology storage 114, a second plurality of parameters associated with consumer node 130. The second plurality of parameters that node observer plug-in 115 may use to determine the second proof of innocence value may differ from the first plurality of parameters that node observer plug-in 115 may use to determine the first proof of innocence value. For example, the second plurality of parameters may contain data associated with prior analyses performed on consumer node 130 (e.g., an indication of whether consumer node 130 may have been flagged for engaging in suspicious consumer-initiated transactions, an indication of whether consumer node 130 may have been isolated from the network, an indication of whether consumer node 130 may have been reinstated as a node within the network, prior proof of innocence values associated with consumer node 130, and the like). Node observer plug-in 115 may transmit the second plurality of parameters associated with consumer node 130 to innocence calculator 116. Innocence calculator may use the instructions from enterprise organization node 120, discussed in step 401, to assign a weight to each parameter of the second plurality of parameters determined by node observer plug-in 115.

Innocence calculator 116 may determine the second proof of innocence value associated with consumer node 130 using the weight parameters determined in step 402 as well as the weighted parameters of the second plurality of parameters. Innocence calculator 116 may combine the weighted value of each parameter of the first plurality of parameters (e.g., the weighted parameters determined in step 402) and the weighted value of each parameter of the second plurality of parameters. By combining the weighted value of each parameter within the first plurality of parameters with the weighted value of each parameter within the second plurality of parameters, innocence calculator 116 may determine a second proof of innocence value associated with consumer node 130. Node observer plug-in 115 may transmit the second proof of innocence value to network topology storage 114. Network topology storage 114 may store the second proof of innocence value with the data associated with consumer node 130, as discussed in connection with FIG. 2B.

At step 406, node observer plug-in 115 may use the second proof of innocence value to determine whether to reinstate consumer node 130 as a node within the network. Node observer plug-in 115 may compare the second proof of innocence value, determined in step 405, to a second threshold. Node observer plug-in 115 may receive, from enterprise organization node 120, the second threshold against which the second proof of innocence value may be compared. The threshold, determined by enterprise organization node 120, may indicate the minimum proof of innocence value that may be necessary to isolate consumer node 130 from the network (e.g., a value of 50 may be the minimum proof of innocence value necessary to isolate consumer node 130 from the network). Node observer plug-in 115 may transmit the second threshold to network topology storage 114. Network topology storage 114 may store the second threshold with the data associated with consumer node 130, as discussed in connection with FIG. 2B.

Referring to FIG. 4D, at step 407a, node observer plug-in 115 may determine, based on the comparison in step 406, that the second proof of innocence value associated with consumer node 130 may exceed the second threshold determined in step 406. Node observer plug-in 115 may determine, based on the proof of innocence value exceeding the threshold, that consumer node 130 may be isolated from the network. For example, if the minimum value that may be necessary to isolate consumer node 130 from the network is a value of 50, a proof of innocence value of 75 may prompt node observer plug-in 115 to isolate consumer node 130 from the network. Distributed ledger infrastructure 110 may reconfigure the blockchain network to operate without consumer node 130, as discussed in step 408a.

Alternatively, at step 407b, node observer plug-in 115 may determine, based on the comparison in step 406, that the second proof of innocence value associated with consumer node 130 may fall below the threshold determined in step 406. Node observer plug-in 115 may determine, based on the second proof of innocence value falling below the threshold, that consumer node 130 may remain with the network. For example, if the minimum value that may be necessary to isolate consumer node 130 from the network is a value of 50, a proof of innocence value of 25 may prompt node observer plug-in 115 to allow consumer node 130 to remain within the network. Distributed ledger infrastructure 110 may reconfigure the blockchain network to reinstate consumer node 130, as discussed in step 408b.

Referring to FIG. 4E, at step 408a, distributed ledger infrastructure 110 may reconfigure the blockchain network to operate without consumer node 130 based on determining, by node observer plug-in 115, that the second proof of innocence value may exceed the second threshold. Reconfiguring the blockchain network may comprise identifying, by node observer plug-in 115, the consumer-initiated transactions associated with consumer node 130. The consumer-initiated transactions associated with consumer node 130 may be stored within network topology storage 114. Node observer plug-in 115 may retrieve, from network topology storage 114, the consumer-initiated transactions associated with consumer node 130. Node observer plug-in 115 may identify, from the consumer-initiated transactions associated with consumer node 130, the consumer-initiated transactions that may be associated with suspicious activity. Node observer plug-in 115 may terminate the consumer-initiated transactions that may be associated with suspicious activity. Terminating the consumer-initiated transactions may comprise identifying the entities associated with the consumer-initiated transaction that may be associated with suspicious activity (e.g., consumer node 130 may have conducted transactions, which may be associated with suspicious activity, with a financial institution). Terminating the consumer-initiated transactions may comprise notifying the entities associated with the consumer-initiated transaction (e.g., the financial institution) that the transaction might not be honored (e.g., the transaction between consumer node 130 and the financial institution may be canceled, the processing of the transaction between consumer node 130 and the financial institution may be terminated, or the like).

At step 408b, distributed ledger infrastructure 110 may reconfigure the blockchain network to reinstate consumer node 130 as a node within the blockchain network based on determining, by node observer plug-in 115, that the second proof of innocence value may fall below the second threshold. Reconfiguring the blockchain network may comprise identifying, by node observer plug-in 115, the consumer-initiated transactions associated with consumer node 130. The consumer-initiated transactions associated with consumer node 130 may be stored within network topology storage 114. Node observer plug-in 115 may retrieve, from network topology storage 114, the consumer-initiated transactions associated with consumer node 130. Node observer plug-in 115 may add the consumer-initiated transactions associated with consumer node 130 to the blockchain network. Adding the consumer-initiated transactions into the blockchain network may comprise identifying the entities associated with the consumer-initiated transactions (e.g., consumer node 130 may have conducted transactions with educational institutions, financial institutions, and the like). Adding the consumer-initiated transactions into the blockchain network may comprise notifying the entities associated with the consumer-initiated transactions that the transactions may be honored (e.g., consumer node 130 and the entity may complete the transaction, consumer node 130 and the entity may begin processing of the transaction, or the like).

FIG. 5 depicts a flow diagram illustrating one example method for isolating and reinstating nodes in a distributed ledger using proof of innocence in accordance with one or more aspects described herein. The processes illustrated in FIG. 5 are merely sample processes and functions. The steps shown may be performed in the order shown, in a different order, more steps may be added, or one or more steps may be omitted, without departing from the invention. In some examples, one or more steps may be performed simultaneously with other steps shown and described.

At step 501, node observer plug-in 115 may monitor the consumer-initiated transactions associated with consumer node 130. Node observer plug-in 115 may store the consumer-initiated transactions associated with consumer node 130 within network topology storage 114.

At step 502, node observer plug-in 115 may analyze the consumer-initiated transactions associated with consumer node 130. Node observer plug-in 115 may determine parameters associated with consumer node 130. For example, node observer plug-in 115 may determine a total number of consumer-initiated transactions that consumer node 130 may have submitted to enterprise organization node 120, a number of consumer-initiated transactions that may have been rejected by enterprise organization node 120, the types of consumer-initiated transactions that consumer node 130 may have submitted to enterprise organization node 120, or the like. Node observer plug-in 115 may analyze previous consumer-initiated transactions associated with consumer node 130 to determine additional parameters. For example, node observer plug-in 115 may determine whether consumer node 130 was previously flagged for engaging in suspicious transactions, a plurality of proof of innocence values associated with consumer node 130 from prior analyses, a number of instances where consumer node 130 may have been isolated from the network, a number of instances where consumer node 130 may have been reinstated as a node within the network, or the like. Node observer plug-in 115 may transmit the determined parameters to network topology storage 114. Network topology storage 114 may store the determined parameters.

Node observer plug-in 115 may determine, using the determined parameters, whether consumer node 130 may be engaged in suspicious consumer-initiated transactions. For example, node observer plug-in 115 may determine that consumer node 130 may primarily engage in asset transfers and that the number of consumer-initiated transactions that were rejected by enterprise organization 120 may be high (e.g., greater than or equal to 35% of the total number of consumer-initiated transactions associated with consumer node 130). Node observer plug-in 115 may flag consumer node 130 for further analysis.

Node observer plug-in 115 may further analyze consumer node 130 using a proof of innocence value associated with consumer node 130. Node observer plug-in 115 may use the proof of innocence value to determine whether consumer node 130 should be isolated from the blockchain network. To determine the proof of innocence value associated with consumer node 130, node observer plug-in 115 may initialize innocence calculator 116 to determine to the proof of innocence value. Initializing innocence calculator 116 may comprise configuring innocence calculator 116 to receive, from node observer plug-in 115, a first plurality of parameters determined by node observer plug-in 115. Initializing innocence calculator 116 may further comprise receiving, from enterprise organization node 120, instructions for assigning a weight to each parameter determined by node observer plug-in 115.

At step 503, innocence calculator may assign a weight to each parameter within the first plurality of parameters. Innocence calculator 116 may determine, according to instructions from enterprise organization node 120, a weighted value for each parameter determined by node observer plug-in 115. Node observer plug-in 115 may transmit the weighted value for each parameter to network topology storage 114. Network topology storage 114 may store the weighted parameters with the data associated with consumer node 130.

Innocence calculator 116 may combine the weighted value of each parameter determined by node observer plug-in 115. By combining the weighted value of each parameter, innocence calculator 116 may determine a proof of innocence value associated with consumer node 130. Node observer plug-in 115 may transmit the determined proof of innocence value to network topology storage 114. Network topology storage 114 may store the determined proof of innocence value with the data associated with consumer node 130.

At step 504, node observer plug-in 115 may compare the proof of innocence value to a first threshold to determine whether consumer node 130 should be isolated from the blockchain network. Node observer plug-in 115 may receive, from enterprise organization node 120, the threshold against which the proof of innocence value may be compared. The threshold, determined by enterprise organization node 120, may indicate the minimum proof of innocence value that may be necessary to isolate consumer node 130 from the network (e.g., a value of 60 may be the minimum proof of innocence value necessary to isolate consumer node 130 from the network). Node observer plug-in 115 may transmit the threshold to network topology storage 114. Network topology storage 114 may store the threshold with the data associated with consumer node 130.

At step 505, node observer plug-in 115 may determine, based on the comparison in step 504, whether the proof of innocence value exceeds the threshold.

At step 506, node observer plug-in 115 may determine that the proof of innocence value associated with consumer node 130 may fall below the threshold. Node observer plug-in 115 may determine, based on the proof of innocence value falling below the threshold, that consumer node 130 may remain with the network. Node observer plug-in 115 might not perform further analyses on consumer node 130 after determining that consumer node 130 may remain within the network.

Alternatively, at step 507, node observer plug-in 115 may determine that the proof of innocence value associated with consumer node 130 may exceed the threshold. Node observer plug-in 115 may determine, based on the proof of innocence value exceeding the threshold, that consumer node 130 may be isolated from the network. Node observer plug-in 115 may perform further analyses on consumer node 130 after determining that consumer node 130 may be isolated from the network. In particular, node observer plug-in 115 may validate the determination to isolate consumer node 130 from the network.

At step 508, node observer plug-in 115 may gather, from network topology storage 114, a second plurality of parameters associated with consumer node 130 to determine a second proof of innocence score. The second plurality of parameters that node observer plug-in 115 may use to determine the second proof of innocence value may differ from the first plurality of parameters that node observer plug-in 115 may use to determine the first proof of innocence value. Node observer plug-in 115 may transmit the second plurality of parameters associated with consumer node 130 to innocence calculator 116. Innocence calculator may use the instructions from enterprise organization node 120 to assign a weight to each parameter of the second plurality of parameters.

At step 509, innocence calculator 116 may determine the second proof of innocence value associated with consumer node 130. Innocence calculator 116 may combine the weighted value of each parameter of the first plurality of parameters (e.g., the weighted parameters determined in step 503) and the weighted value of each parameter of the second plurality of parameters (e.g., the weighted parameters determined in step 508). Node observer plug-in 115 may transmit the second proof of innocence value to network topology storage 114. Network topology storage 114 may store the second proof of innocence value with the data associated with consumer node 130.

At step 510, node observer plug-in 115 may compare the second proof of innocence value to a second threshold to determine whether consumer node 130 should be reinstated as a node within the blockchain network. Node observer plug-in 115 may receive, from enterprise organization node 120, the second threshold against which the second proof of innocence value may be compared. The second threshold, determined by enterprise organization node 120, may indicate the minimum proof of innocence value that may be necessary to isolate consumer node 130 from the network (e.g., a value of 70 may be the minimum proof of innocence value necessary to isolate consumer node 130 from the network).

At step 511, node observer plug-in 115 may determine, based on the comparison in step 510, whether the second proof of innocence value exceeds the second threshold.

At step 512, node observer plug-in 115 may determine based on the comparison in step 511, that the second proof of innocence value associated with consumer node 130 may exceed the second threshold. Node observer plug-in 115 may determine, based on the proof of innocence value exceeding the threshold, that consumer node 130 may be isolated from the network.

Distributed ledger infrastructure 110 may reconfigure the blockchain network to operate without consumer node 130 based on determining, by node observer plug-in 115, that the second proof of innocence value may exceed the second threshold. Reconfiguring the blockchain network may comprise identifying, by node observer plug-in 115, the consumer-initiated transactions associated with consumer node 130. Node observer plug-in 115 may identify, from the consumer-initiated transactions associated with consumer node 130, the consumer-initiated transactions that may be associated with suspicious activity. Node observer plug-in 115 may terminate the consumer-initiated transactions that may be associated with suspicious activity.

Terminating the consumer-initiated transactions may comprise identifying the entities associated with the consumer-initiated transaction that may be associated with suspicious activity. Terminating the consumer-initiated transactions may comprise notifying the entities associated with the consumer-initiated transaction that the transaction may be terminated, canceled, or the like.

Alternatively, at step 513, node observer plug-in 115 may determine that the second proof of innocence value associated with consumer node 130 may fall below the second threshold. Node observer plug-in 115 may determine, based on the second proof of innocence value falling below the second threshold, that consumer node 130 may be reinstated as a node within the network. Node observer plug-in 115 may transmit a notification to distributed ledger infrastructure 110 to reconfigure the blockchain network to reinstate consumer node 130 as a node within the blockchain network.

Distributed ledger infrastructure 110 may reconfigure the blockchain network to reinstate consumer node 130 as a node within the blockchain network. Reconfiguring the blockchain network may comprise identifying, by node observer plug-in 115, the consumer-initiated transactions associated with consumer node 130. Node observer plug-in 115 may add the consumer-initiated transactions associated with consumer node 130 to the blockchain network. Adding the consumer-initiated transactions into the blockchain network may comprise identifying the entities associated with the consumer-initiated transactions. Adding the consumer-initiated transactions into the blockchain network may comprise notifying the entities associated with the consumer-initiated transactions that the transactions may be completed, processed, or the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a consumer computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system configured to operate in a decentralized peer-to-peer (P2P) network, comprising:
   a plurality of enterprise organization nodes;
   a plurality of consumer nodes;
   a network topology storage configured to store:
      a plurality of consumer-initiated transactions submitted to the plurality of enterprise organization nodes;
      parameters used to analyze the plurality of consumer-initiated transactions;
      proof of innocence values associated with the plurality of consumer nodes; and
      determination values indicating whether the one or more of the plurality of consumer nodes are to be isolated,
      wherein the network topology storage is distributed across the P2P network; and
   a node observer plug-in comprising:
      one or more processors; and
      memory storing instructions that, when executed by the one or more processors, cause the node observer plug-in to:
         analyze consumer-initiated transactions associated with a consumer node;
         determine, based on a first plurality of parameters associated with the consumer-initiated transactions, a proof of innocence value;
         compare the proof of innocence value to a first threshold;
         determine to, based on the proof of innocence value exceeding the first threshold, isolate the consumer node from the P2P network;
         determine, based on a second plurality of parameters associated with the consumer node, a second proof of innocence value, wherein the second plurality of parameters is different from the first plurality of parameters;
         compare the second proof of innocence value to a second threshold; and
         validate, based on the second proof of innocence value, the determination to isolate the consumer node from the P2P network, wherein the instructions, when executed by the one or more processors, cause the node observer plug-in to validate the determination to isolate the consumer node from the P2P network by causing:
            based on the second proof of innocence value exceeding a second threshold, confirming isolation of the consumer node from the P2P network; or
            based on the second proof of innocence value falling below the second threshold, reinstating the consumer node into the P2P network.

2. The system of claim 1, wherein the first plurality of parameters comprises at least one of:
   a quantity of the consumer-initiated transactions;
   a quantity of rejected consumer-initiated transactions;
   a type of the consumer-initiated transaction; or
   historical data associated with the consumer-initiated transactions.

3. The system of claim 1, wherein the instructions, when executed by the one or more processors, cause the node observer plug-in to isolate the consumer node from the P2P network by causing configuring the P2P network to operate without the consumer node, wherein the causing configuring the P2P network to operate without the consumer node comprises:
   identifying one or more consumer-initiated transactions associated with the consumer node;
   identifying, from the one or more consumer-initiated transactions associated with the consumer node, transactions associated with malicious activity; and
   removing, from the P2P network, the transactions associated with malicious activity.

4. The system of claim 1, wherein the instructions, when executed by the one or more processors, cause the node observer plug-in to reinstate the consumer node into the P2P network by causing configuring the P2P network to include the consumer node, wherein the causing configuring the P2P network to include the consumer node comprises causing:
   identifying one or more consumer-initiated transactions associated with the consumer node; and
   adding the identified one or more consumer-initiated transactions associated with the consumer node to the P2P network.

5. The system of claim 1, wherein the instructions, when executed by the one or more processors, cause the node observer plug-in to determine the second proof of innocence value further based on the first plurality of parameters.

6. The system of claim 1, wherein the instructions, when executed by the one or more processors, cause the node observer plug-in to assign a weight to each parameter of the first plurality of parameters.

7. The system of claim 1, wherein the instructions, when executed by the one or more processors, cause the node observer plug-in to determine the second proof of innocence value by causing:
   assigning a weight to each parameter of the first plurality of parameters; and
   assigning a weight to each parameter of the second plurality of parameters.

8. A node observer plug-in configured to operate in a decentralized peer-to-peer (P2P) network, comprising:
   one or more processors;
   and memory storing at least a portion of a blockchain of the decentralized P2P network and computer-readable instructions that, when executed by the one or more processors, cause the node observer plug-in to:
   analyze consumer-initiated transactions associated with a consumer node;
   determine, based on a first plurality of parameters associated with the consumer-initiated transactions, a first proof of innocence value;
   compare the first proof of innocence value to a first threshold;
   determine to, based on the first proof of innocence value exceeding the first threshold, isolate the consumer node from the P2P network;
   determine, based on a second plurality of parameters associated with the consumer node, a second proof of innocence value, wherein the second plurality of parameters is different from the first plurality of parameters;

compare the second proof of innocence value to a second threshold; and validate, based on the second proof of innocence value, the determination to isolate the consumer node from the P2P network, wherein the instructions, when executed by the one or more processors, cause the node observer plug-in to validate the determination to isolate the consumer node from the P2P network by causing:

based on the second proof of innocence value exceeding a second threshold, confirming isolation of the consumer node from the P2P network;

or based on the second proof of innocence value falling below the second threshold, reinstating the consumer node into the P2P network.

9. The system of claim 1, wherein the second plurality of parameters comprises data associated with prior analysis of the consumer node.

10. The node observer plug-in of claim 8, wherein the first plurality of parameters comprises at least one of:
 a quantity of the consumer-initiated transactions;
 a quantity of rejected consumer-initiated transactions;
 a type of the consumer-initiated transaction;
 or historical data associated with the consumer-initiated transactions.

11. The node observer plug-in of claim 8, wherein the instructions, when executed by the one or more processors, cause the node observer plug-in to isolate the consumer node from the P2P network by causing configuring the P2P network to operate without the consumer node, wherein the causing configuring the P2P network to operate without the consumer node comprises:
 identifying one or more consumer-initiated transactions associated with the consumer node;
 identifying, from the one or more consumer-initiated transactions associated with the consumer node, transactions associated with malicious activity;
 and removing, from the P2P network, the transactions associated with malicious activity.

12. The node observer plug-in of claim 8, wherein the instructions, when executed by the one or more processors, cause the node observer plug-in to reinstate the consumer node into the P2P network by causing configuring the P2P network to include the consumer node, wherein the causing configuring the P2P network to include the consumer node comprises causing:
 identifying one or more consumer-initiated transactions associated with the consumer node; and adding the identified one or more consumer-initiated transactions associated with the consumer node to the P2P network.

13. The node observer plug-in of claim 8, wherein the instructions, when executed by the one or more processors, cause the node observer plug-in to determine the second proof of innocence value further based on the first plurality of parameters.

14. The node observer plug-in of claim 8, wherein the instructions, when executed by the one or more processors, cause the node observer plug-in to determine the first proof of innocence value by causing assigning a weight to each parameter of the first plurality of parameters.

15. The node observer plug-in of claim 8, wherein the instructions, when executed by the one or more processors, cause the node observer plug-in to determine the second proof of innocence value by causing:
 assigning a weight to each parameter of the first plurality of parameters; and
 assigning a weight to each parameter of the second plurality of parameters.

16. The node observer plug-in of claim 8, wherein the second plurality of parameters comprises data associated with prior analysis of the consumer node.

17. A method comprising:
 at a computing device configured to operate in a decentralized peer-to-peer (P2P) network and including at least one or more processors and memory storing at least a portion of a blockchain of the P2P network:
 analyzing, by a node observer plug-in, consumer-initiated transactions associated with a consumer node;
 determining, based on a first plurality of parameters associated with the consumer-initiated transactions, a first proof of innocence value associated with the consumer node;
 comparing, by the node observer plug-in, the first proof of innocence value to a first threshold;
 determining to, by the node observer plug-in and based on the first proof of innocence value exceeding the first threshold, isolate the consumer node from the P2P network;
 determining, based on a second plurality of parameters associated with the consumer node, a second proof of innocence value, wherein the second plurality of parameters is different from the first plurality of parameters;
 comparing the second proof of innocence value to a second threshold; and
 validating, by the node observer plug-in based on the second proof of innocence value exceeding a second threshold, the determination to isolate the consumer node from the P2P network, wherein the validating comprises:
 based on the second proof of innocence value exceeding a second threshold, confirming isolation of the consumer node from the P2P network;
 or based on the second proof of innocence value falling below the second threshold, reinstating the consumer node into the P2P network.

18. The method of claim 17, wherein the first plurality of parameters comprises at least one of:
 a quantity of the consumer-initiated transactions;
 a quantity of rejected consumer-initiated transactions;
 a type of the consumer-initiated transaction;
 or historical data associated with the consumer-initiated transactions.

19. The method of claim 17, wherein the determining the second proof of innocence value comprises:
 assigning a weight to each parameter of the first plurality of parameters;
 and assigning a weight to each parameter of a second plurality of parameters associated with the consumer-initiated transactions.

20. The method of claim 17, wherein the second plurality of parameters comprises data associated with prior analysis of the consumer node.

* * * * *